United States Patent
Kondareddy

(10) Patent No.: US 10,396,848 B1
(45) Date of Patent: Aug. 27, 2019

(54) DEVICES, SYSTEMS AND METHODS FOR TRANSMITTING PROTOCOL CONFIGURATION INFORMATION BETWEEN MULTI-PROTOCOL DEVICES

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/217,298

(22) Filed: Dec. 12, 2018

Related U.S. Application Data

(60) Provisional application No. 62/741,170, filed on Oct. 4, 2018.

(51) Int. Cl.
| | |
|---|---|
| *H04B 1/7143* | (2011.01) |
| *H04W 4/80* | (2018.01) |
| *H04W 72/04* | (2009.01) |
| *H04W 84/12* | (2009.01) |

(52) U.S. Cl.
CPC ............ *H04B 1/7143* (2013.01); *H04W 4/80* (2018.02); *H04W 72/0446* (2013.01); *H04W 84/12* (2013.01)

(58) Field of Classification Search
CPC ..... H04W 84/20; H04W 16/00; H04W 76/10; H04W 88/02; H04W 88/06; H04B 1/7143
See application file for complete search history.

(56) References Cited

U.S. PATENT DOCUMENTS

| | | | |
|---|---|---|---|
| 8,331,289 B1 * | 12/2012 | Lee ........................ | H04B 1/006 370/328 |
| 9,648,662 B2 * | 5/2017 | Herrala .................. | H04W 84/20 |
| 2010/0322287 A1 * | 12/2010 | Truong ............. | H04W 72/1215 375/133 |
| 2016/0143074 A1 * | 5/2016 | Wietfeldt ............... | H04B 15/00 370/329 |
| 2016/0381572 A1 * | 12/2016 | Shahar .................... | H04W 4/80 455/41.2 |
| 2018/0006681 A1 * | 1/2018 | Bi ........................ | H04B 1/7143 |

* cited by examiner

*Primary Examiner* — David S Huang

(57) ABSTRACT

A method can include receiving frequency hop configuration data for a first wireless communication protocol via a second wireless communication protocol in second communication circuits; and configuring first communication circuits to communicate according to the first communication protocol with frequency hopping indicated by the frequency hop configuration data; wherein the first communication circuits and second communication circuits are formed in a same combination device. Related devices and systems are also disclosed.

20 Claims, 8 Drawing Sheets

(BACKGROUND)

DEVICES, SYSTEMS AND METHODS FOR TRANSMITTING PROTOCOL CONFIGURATION INFORMATION BETWEEN MULTI-PROTOCOL DEVICES

This application claims the benefit of U.S. provisional patent application having Ser. No. 62/741,170, filed on Oct. 4, 2018, the contents of which are incorporated by reference herein.

TECHNICAL FIELD

The present disclosure relates generally to wireless networks, and more particularly to wireless networks that include combination devices able to transmit according to two or more communication protocols.

BACKGROUND

Conventional short range wireless networks, such as Bluetooth (BT) networks, can enable networks (e.g., piconets) to be interconnected to one another by one or more devices to form a collection of interconnected networks (e.g., a scatternet). FIG. 12 is diagram of a conventional scatternet 1201. Scatternet 1201 can include three piconets 1203-0, 1203-1 and 1203-2, controlled by BT master devices B_M0, B_M1 and B_M2, respectively. Piconet 1203-0 can include slave devices B_S1 and B_S4. Piconet 1203-1 can include slave devices B_S2 and B_S3 and be connected to piconet 1203-0 by master device B_M0. Piconet 1203-2 can include slave devices B_S4, B_S5 and B_S6 and be connected to piconet 1203-0 by slave device B_S4.

Each master device (B_M0, B_S2, B_S2) can dictate communications of its piconet according to the BT protocol, which includes adaptive frequency hopping (AFH). Thus, piconets 1203-0, 1203-1, 1203-2 communicate according to AFH settings AFH0, AFH1 and AFH2, respectively. Because piconets (1203-0, 1203-1, 1203-2) of the scatternet 1201 are within close proximity of one another, transmissions from the various piconets can interfere with one another. This can degrade communications and/or require master devices to cycle through optimization procedures to arrive a best AFH setting for the environment.

It would be desirable to arrive at some way of improving transmissions of networks in proximity to each other, including but not limited to BT scatternets.

DETAILED DESCRIPTION

Figure 1A:
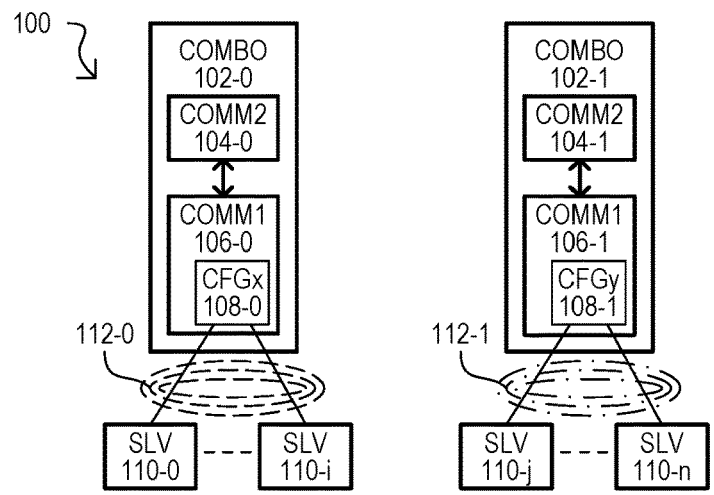
FIGS. 1A to 1C are a sequence of block diagrams showing a system and operations according to an embodiment.

According to embodiments, systems can include combination devices that can communicate wirelessly according to two or more different protocols. A first combination device can determine configuration settings for a first protocol (e.g., optimal settings for the operating environment). The first combination device can then transmit such configuration settings according to a second protocol. A second combination device can receive the configuration settings according to the second protocol. The second combination device can then configure its communications according to the first protocol with the configuration settings.

In some embodiments, a first protocol can include frequency hopping, and configuration setting can be, or control, frequency hopping for communications according to the first protocol.

In some embodiments, first and second combination devices can be Bluetooth (BT)—WLAN combination devices that can communicate according to one or more BT standards and one or more IEEE 802.11 wireless standards.

In the various embodiments below, like items are referred to by the same reference characters, but with the leading digit(s) corresponding to the figure number.

Figure 1B:
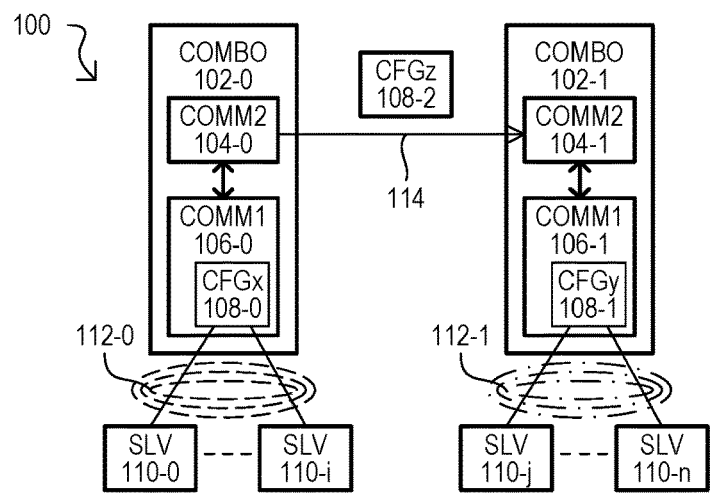
Figure 1C:
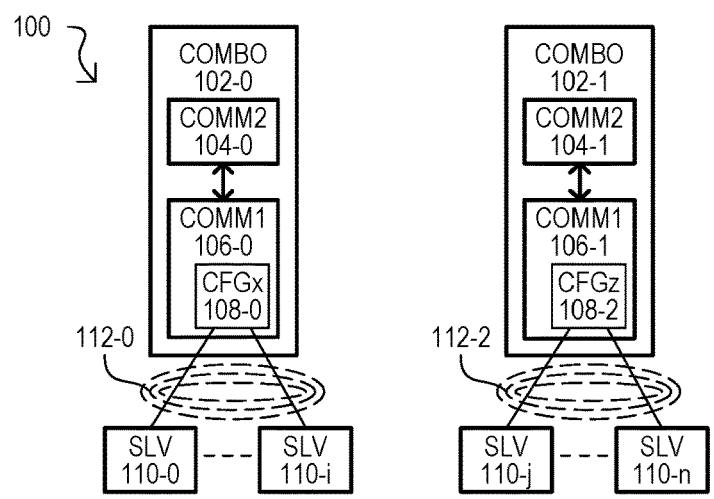

FIGS. 1A to 1C are a sequence of block diagram showing a system 100 and operations according to embodiments. A system 100 can include a first combination device 102-0 and a second combination device 102-1. Each combination device 102-0/1 can include first communication circuits 106-0/1 and second communication circuits 104-0/1. First communication circuits 106-0/1 can communicate according to a first wireless protocol. Second communication circuits 106-0/1 can communicate according to a second wireless protocol.

First combination device 102-0 can serve as a master device to a number of slave devices 110-0 to 110-*i* and communicate with the slave devices (110-0 to 110-*i*) according to the first protocol as configured by configuration data 108-0. In a similar fashion, second combination device 102-1 can serve as a master device to a number of slave devices 110-*j* to 110-*n* and communicate with the slave devices (110-*j* to 110-*n*) according to the first protocol as configured by configuration data 108-1.

Referring to FIG. 1A, first communication circuits 106-0 within first combination device 102-0 can be configured according to configuration data CFGx 108-0, and thus can communicate with slave devices (110-0 to 110-*i*) in with first communication parameters, shown as 112-0. In some embodiments, communication parameters can include which frequencies and/or bands of frequencies are used, or how such frequencies and/or bands are selected. In some embodiments, communication parameters can include automatic frequency hopping parameters. Second communication circuits 106-1 within first combination device 102-1 can be configured according to different configuration data CFGy 108-1, and thus can communicate with slave devices (110-*j* to 110-*n*) with second communication parameters (different form the first communication parameters), shown as 112-1.

Referring to FIG. 1B, first combination device 102-0 can determine configuration data CFGz. In some embodiments, a first combination device 102-0 can make such a determination based on an operating environment of the first combination device 102-0. As but one example, such a determination can arrive at optimal settings for first communication circuit to operate in the environment. Configuration data CFGz may or may not correspond to the configuration data CFGx for the first communication circuits 106-0 of the first combination device 102-0.

Referring still to FIG. 1B, a first combination device 102-0 can transmit the configuration data CFGz to second combination device 102-1 over a wireless communication path 114 using its second communication circuits 104-0 operating according to the second protocol. A wireless communication path 114 can be a direct path (e.g., point-to-point) or can be an indirect path through one or more intermediate devices. In some embodiments, wireless communication path 114 can be an undirected transmission (e.g., non-addressed broadcast). In addition or alternatively, wireless communication path 114 can be a directed transmission (e.g., transmission addressed to the second combination device 102-1). A second combination device 102-1 can receive the configuration data CFGz through its to second communication circuits 104-1 operating according to the second protocol.

Referring to FIG. 1C, in response to the receipt of the configuration data CFGz, second combination device can reconfigure its first communication circuits 106-1 with the configuration data (i.e., CFGy replaced with CFGz). Consequently, first communication circuits 106-1 can communicate with slave devices (110-*j* to 110-*n*) with updated communication parameters, shown as 112-2 which may or may not be the same as 112-0.

In some embodiments, differences in configuration data 108-0/1/2 can result in differences in how frequency hopping is conducted. However, in alternate embodiments such a change in configuration data can change communication parameters other than those that establish frequency hopping. For example, configuration can result in selection or non-selection of particular frequencies, a selection of a smaller portion of a frequency bad (e.g., sub-band). One skilled in the art would recognize that embodiments can include the transmission of configuration data for implementing any other suitable difference in communication (e.g., changing from 112-1 to 112-2.

In some embodiments, one or both of combination devices 102-0/1 can be a single integrated circuit device. First and second communication circuits (104-0/106-0, 104-1/106-1) can be formed in a same integrated circuit substrate of their respective combination device 102-0/1.

Figure 2:
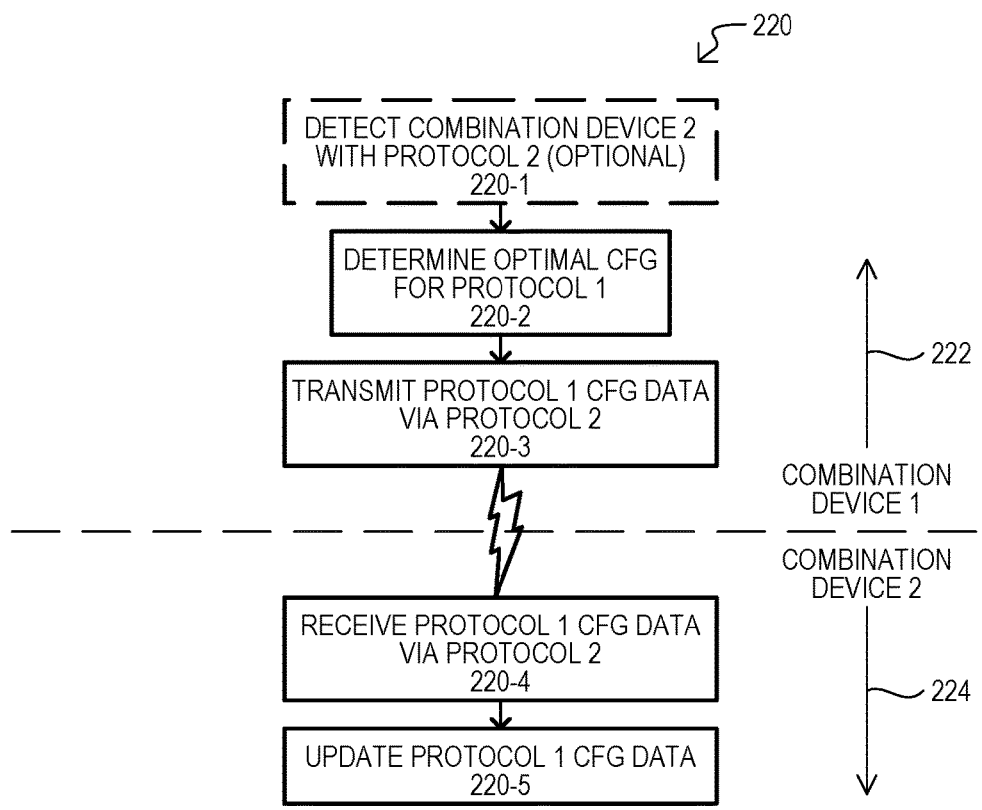
FIG. 2 is a flow diagram of a method according to an embodiment.

FIG. 2 is a flow diagram showing a method 220 according to an embodiment. A method 220 can include a first portion 222 that can be executed by a first combination device, and a second portion 224 that can be executed by a second combination device. First and second devices can wirelessly communicate according to at least a first and second protocol.

A method 220 can optionally include a first combination device determining the presence of a second combination device 220-1. Such an action can include any option available under a second protocol, as but a few of many possible examples: a first combination device inquiring over the second protocol network (sending a beacon and receiving a response from the second combination device), a first device listening to the second protocol network (receiving a beacon from a second combination device), or a first device receiving information from another device on the second protocol device (e.g., access point device of the network).

A first combination device can determine an optimal configuration for a first protocol 220-2. Such an action can include a first combination device using configuration data of its own first communication circuits for operating according to the first protocol. Such an action can also include a first combination device executing an evaluation operation for the first protocol network. As but one example, a first combination device can cycle through available frequencies, bands, or channels, to determine which are busy, suffer from interference, etc. Such actions can also include a first combination device acquiring error information for the frequencies/bands/channels. A first combination device can develop configuration data from such a determination.

Once configuration data has been created, a first combination device can transmit the first protocol configuration data via the second protocol 220-3. As understood herein, such an action can include a broadcast transmission, an addressed transmission, or both. In some embodiments, such an action can include packetizing the first protocol configuration data.

A method 220 can include a second combination device receiving the first protocol configuration data via the second protocol 220-4. Such an action can include communication circuits depacketizing the configuration data. In some embodiments, such an action can include detecting a packet as being a special type that includes the configuration data.

A second combination device can then update its first protocol configuration data according to the received configuration data 220-5. Such an action can result in a second communication device being able to operate according to the first protocol in an optimal or near optimal fashion for the environment without necessarily having to execute an evaluation operation of its own.

Figure 3A:
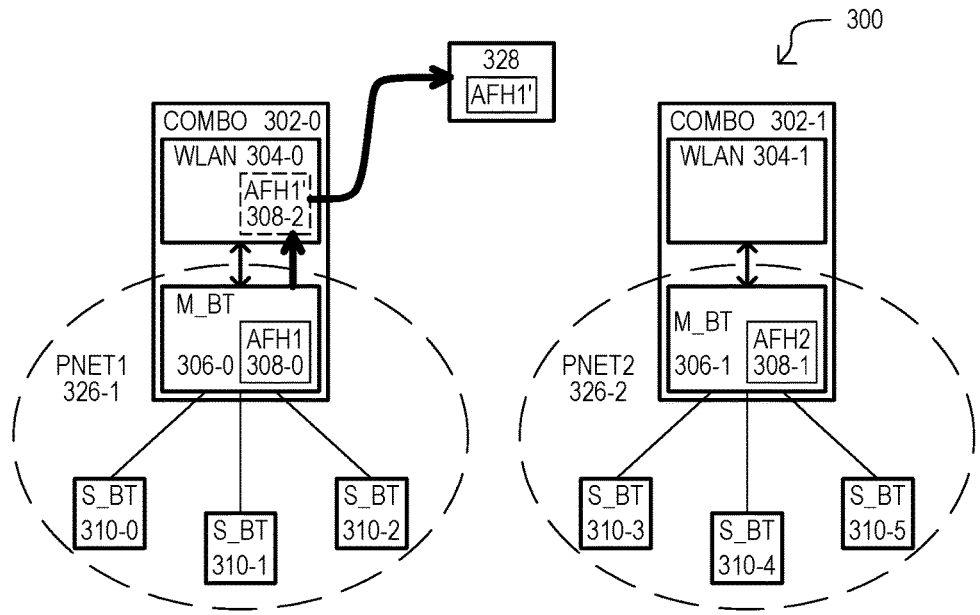
FIGS. 3A and 3B are a sequence of block diagrams showing systems and operations according to another embodiment.
Figure 3B:
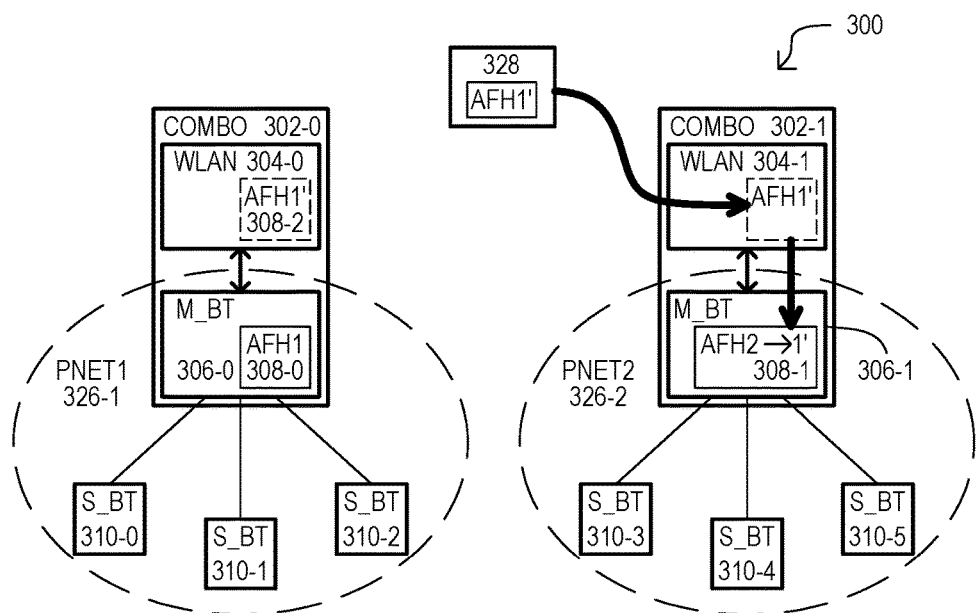

FIGS. 3A and 3B are block diagrams showing a system 300 and operations according to embodiments. A system 300 can be one implementation of that shown in FIG. 1. A system 300 can include a first combination device 302-0 and a second combination device 302-1. Combination devices 302-0/1 can be BT—WLAN combination devices. Each combination device 302-0/1 can include WLAN circuits 304-0/1, BT circuits 306-0/1, and a number of other BT devices 310-0 to 310-5. WLAN circuits (304-0/1) can provide wireless communications according to one or more IEEE 802.11 wireless specifications. In some embodiments, WLAN circuits can communicate over two bands. BT circuits 306-0/1 can provide wireless communications according to one or more BT protocols, including adaptive frequency hopping (AFH) according to configuration values 308-0/1.

BT circuits 306-0 can be configured as a BT master, and form a first piconet 326-1 that includes other BT devices 310-0 to -2 configured as BT slaves. BT circuits 306-1 can be configured as another BT master, and form a second piconet 326-1 that includes other BT devices 310-3 to -5 configured as BT slaves.

Referring to FIG. 3A, a first combination device 302-0 can determine AFH configuration data (AFH1') for a current operating environment. In some embodiments, configuration data AFH1' can be determined to provide optimal performance for a given environment. Configuration data AFH1' may or may not be configuration data utilized in the BT circuits 306-0 of the same combination device 302-0. Configuration data AFH1' can be forwarded to WLAN circuit 304-0. WLAN circuit 304-0 can packetize the data and transmit it as a packet 328. Packet 328 can be a broadcast packet or a packet addressed to second combination device 302-1. Packet 328 can be transmitted to second combination device 302-1 directly, or the packet can be received by the second combination device 302-1 via one or more intermediate devices.

BT circuits 306-1 within second combination device 302-1 can operate with frequency hopping configured by configuration data AFH2. Configuration data AFH2 can be different than that of first combination device AFH1.

Referring to FIG. 3B, a second combination device 302-1 can receive packet 328 in WLAN circuits 304-1. WLAN circuits 304-1 can extract configuration data AFH1' from the received packet and forward such configuration data to BT circuits 306-1. BT circuits 306-1 can receive transmitted configuration data AFH1' and change operations to execute frequency hopping according to such data.

Figure 4A:
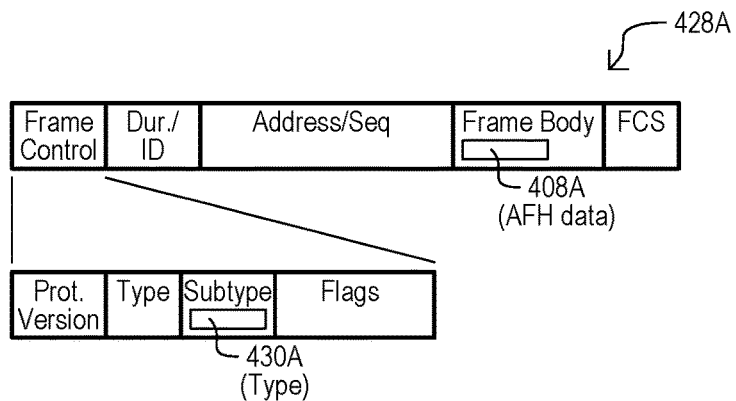
FIGS. 4A and 4B are diagrams of communication frames according to embodiments.
Figure 4B:
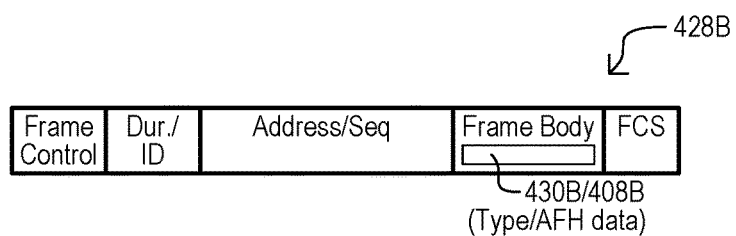

While embodiments can include combination devices that operate according any two or more different wireless protocols, in some embodiments configuration data can be transmitted according to a protocol that transmits data in packets. FIGS. 4A and 4B are diagrams showing examples of configuration data frames for packets according to embodiments.

FIG. 4A shows a frame 428A according to one embodiment. A frame 428A can include various fields, including a control field (Frame Control) and payload (Frame Body). The example shows various other fields (Duration/ID, Address and Sequencing, and a frame check sequence). A control field (Frame Control) can indicate a type of packet and how the packet is to be processed. In the embodiment shown, a control field (Frame Control) can include a protocol version, type and subtype, and flags. In one embodiment, a subtype field can include an identification value 430A which identifies the packet as including configuration data (e.g., AFH) for a second protocol. Transmitted configuration data 408A can be included in a payload (Frame Body).

FIG. 4B shows a frame according to another embodiment. A frame 428B can include fields like that of FIG. 4A, however, an identification value 430A and configuration data 408B can be present in a payload (Frame Body).

Figure 5:
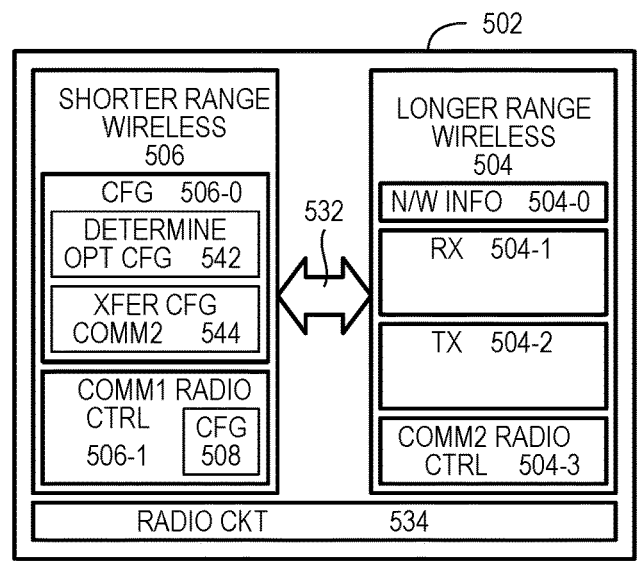
FIG. 5 is a block diagram of a combination device according to an embodiment.

FIG. 5 is a block diagram of a combination device 502 according to an embodiment. In some embodiments, a combination device 502 can be one of those shown as 102-0/1 in FIGS. 1A to 1C. A combination device 502 can include first communication circuits 506, second communication circuits 504, and radio circuits 534. First communication circuits 506 can be wireless communication circuits compatible with a first protocol that supports a first transmission range. First communication circuits 506 can include a configuration section 506-0 and first radio control circuits 506-1. Configuration section 506-0 can include determination circuits 542 and transfer circuits 544. Determination circuits 542 can be configured to determine configuration data for a first protocol, according to any of the embodiments described herein, or equivalents. Transfer circuits 544 can transfer configuration data from first communication circuits 506 to second communication circuits 504. In some embodiments, such a transfer can be over a bridge 532 that connects a first and second communication circuits 504/506. First radio control circuits 506-1 can control transmissions according to a first protocol based on configuration data CFG 508. First radio control circuits 506-1 can be configured to alter configuration data 508 in response to configuration data received from second communication circuits 504.

Second communication circuits 504 can be wireless communication circuits compatible with a protocol that supports a second transmission range that is greater than the first transmission range. Second communication circuits 504 can include network information 504-0, a receive section 504-1, a transmit section 504-2, and second radio control circuits 504-3. Network information 504-0 can include information on a network operating according to a second protocol to enable second communication circuits to transmit configuration data for a first protocol over such a second protocol network. Receive section 504-1 can control data reception operations according to the second protocol. In some embodiments, receive section 504-1 can be configured to receive configuration data according to the second protocol. Such configuration data can be transferred to first communication circuits 506 over bridge 532, which can then change configuration data 508 for the first protocol. Transmit section 504-2 can control data transmission operations according the second protocol. In some embodiments, transmit 504-2 can be configured to transmit configuration data received from first communication circuits 506. Such transmitted configuration data can then be utilized by another combination device (not shown) to configure its first protocol operations.

Radio circuits 534 can transmit data according to the first and second protocol.

Figure 6:
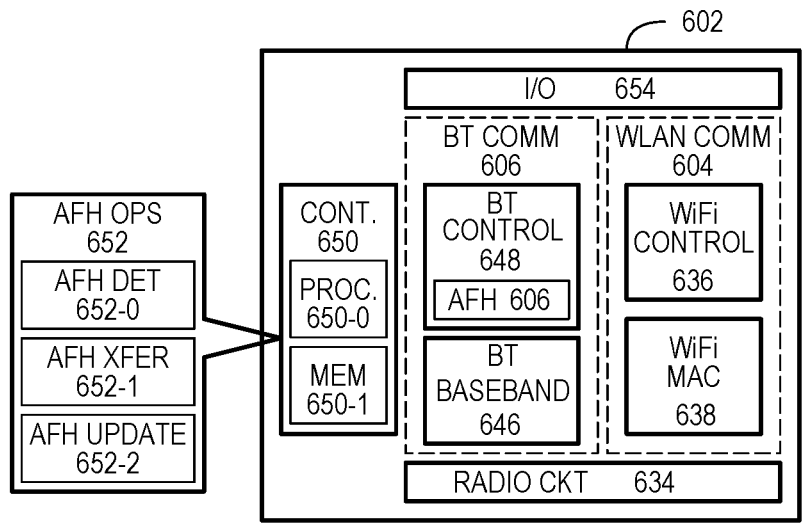
FIG. 6 is a block diagram of a combination Bluetooth (BT)—WLAN device according to an embodiment.

FIG. 6 is a block diagram of a combination device 602 according to another embodiment. In some embodiments, combination device 602 can be one particular implementation of either combination device shown as FIGS. 1A to 1C as 102-0/1. A combination device 602 can include first communication circuits 606, second communication circuits 604, controller 650, radio circuits 634, and input/output (I/O) circuits 654. First communication circuits 604 can be BT circuits including BT control circuits 648 and BT baseband circuits 650. BT circuits can operate in a 2.4 GHz band according to one or more BT protocols. BT control circuits 648 can control BT operations, including the formation and transmission of BT packets. BT control circuits 648 can provide AFH configuration data 608 to control frequency hopping operations of BT baseband circuits 646.

Second communication circuits 604 can be WLAN circuits, including a WiFi control circuit 636 and WiFi media access control (MAC) circuits 638. WLAN circuits can also operate in a 2.4 GHz and/or 5.0 GHz bands.

Controller circuits 650 can control operations of a combination device 602, including enabling the transmission of BT AFH configuration over a WLAN network. In the embodiment shown, controller circuits 650 can include one or more processors 650-0 and a memory system 650-1. Controller circuits 650 can be configured to execute AFH operations 652. AFH operations 652 can include AFH determination 652-0, which can determine optimal AFH settings for an operating environment. AFH transfer operations 652-1 can transfer the AFH configuration data to second communication circuits 604. In some embodiments this can include composing a packet payload and/or indicate a type of packet to be transmitted according to the second protocol. AFH update operations 652-2 can update AFH configuration data 606 in BT control circuits 648 in response to a packet received by second communication circuits 604.

Radio circuits 634 can take the form of any of those described herein or equivalents.

I/O circuits 654 can enable control of combination device 602 by another system or person external to the combination device 602. I/O circuits 654 can include circuits that enable communication with the combination device according to any suitable method, including any of various serial data communication standards/methods including but not limited to: serial digital interface (SDI), universal serial bus (USB), universal asynchronous receiver transmitter (UART), $I^2C$, or $I^2S$.

Figure 7:
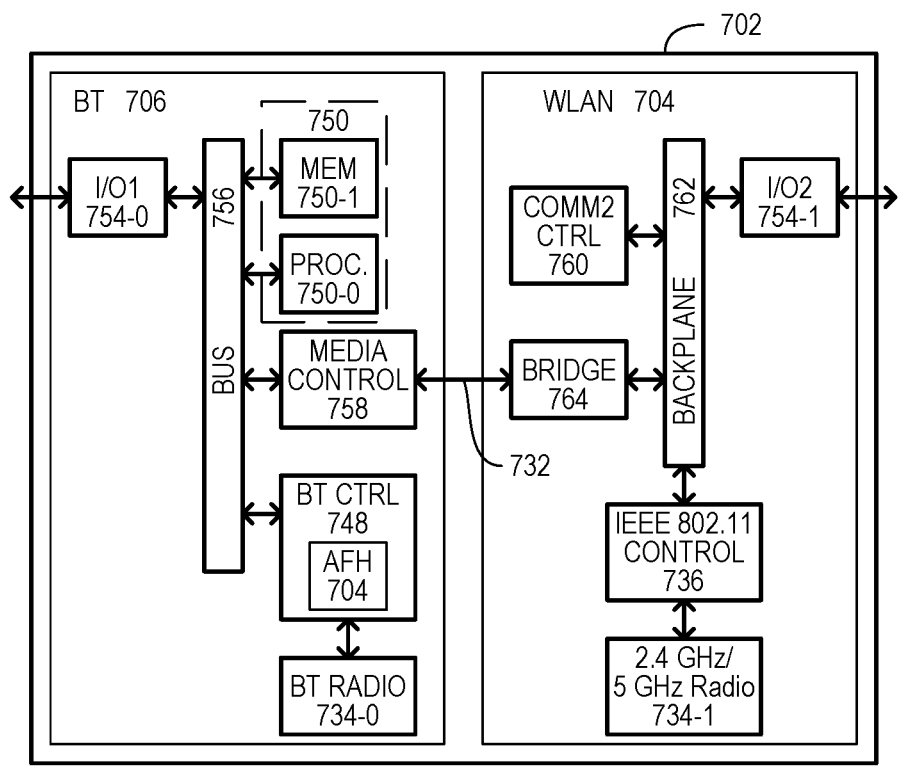
FIG. 7 is a block diagram of a combination Bluetooth BT—WLAN device according to another embodiment.

FIG. 7 is a block diagram of a combination device 702 according to another embodiment. In some embodiments, combination device 702 can be one particular implementation of either of those shown as 102-0/1 in FIGS. 1A to 1C. A combination device 702 can include a BT section 706 and a WLAN section 704. A BT section 706 can include a controller 750, BT control circuits 748, media control circuit 758, and first I/O circuits 754-0 in communication with one another over a bus 756. A controller 750 can control operations of combination device 702, including operations within WLAN section 704. In some embodiments, a controller 750 can issue control signals over bus 756 that can be transmitted to WLAN section 704 over bridge 732 via media control circuits 758. A controller 750 can include one or more processors 750-0 and a memory system 750-1. A controller 750 can determine optimal AFH setting for an embodiment by communication with BT control circuits 748.

BT control circuits 706 can include circuits for performing functions according to one or more BT standards. BT control circuits 706 can control frequency hopping according to data AFH 704. Data AFH 704 can be altered by controller 750 in response to predetermined packets or packet data received by WLAN section 704. BT control circuits 706 can control BT radio 743-0 to operate according to one or more BT protocols including frequency hopping as indicated by data AFH 704.

Media control circuits 758 can communicate with WLAN section 704 over bridge 732 to coordinate communications between BT and WLAN sections (706, 704), including the transmission of AFH configuration data from BT section 706 to WLAN section 704 for transmission and/or the receipt of AFH configuration data from WLAN section 704. First I/O circuits 754-0 can enable communication with the combination device 702 according to any of the embodiments described herein or equivalents.

A WLAN section 704 can include IEEE 802.11 control circuit 736, bridge control circuit 764, second control circuits 760, and second I/O circuits 734-1 in communication with one another over a backplane 762. IEEE 802.11 control circuits 736 can include circuits for performing functions according to any IEEE 802.11 wireless or equivalent standard. IEEE 802.11 control circuits 736 can be connected to dual band radio circuits 734-1. Dual band radio circuits 734-1 can transmit and receive data on two or more WLAN bands (e.g., 2.4 GHz, 5 GHz).

Bridge control circuit 764-2 can control data transfer operations between BT section 706 and WLAN section 704 over bridge 764, including the transfer of control signals or instructions for transmitting AFH data in packets and/or receiving packets that include AFH data. Second I/O circuits 734-1 can enable communication with the combination device 702 according to any of the embodiments described herein or equivalents, including communications with BT section 706 over bridge 732.

Second control circuit 760 can include circuits for organizing packets for transmission and for processing received packets. In some embodiments, second communication control circuits 760 can packetize AFH configuration data for transmission on a WLAN network and/or extract AFH configuration data from a packet received from a WLAN network.

Figure 8:
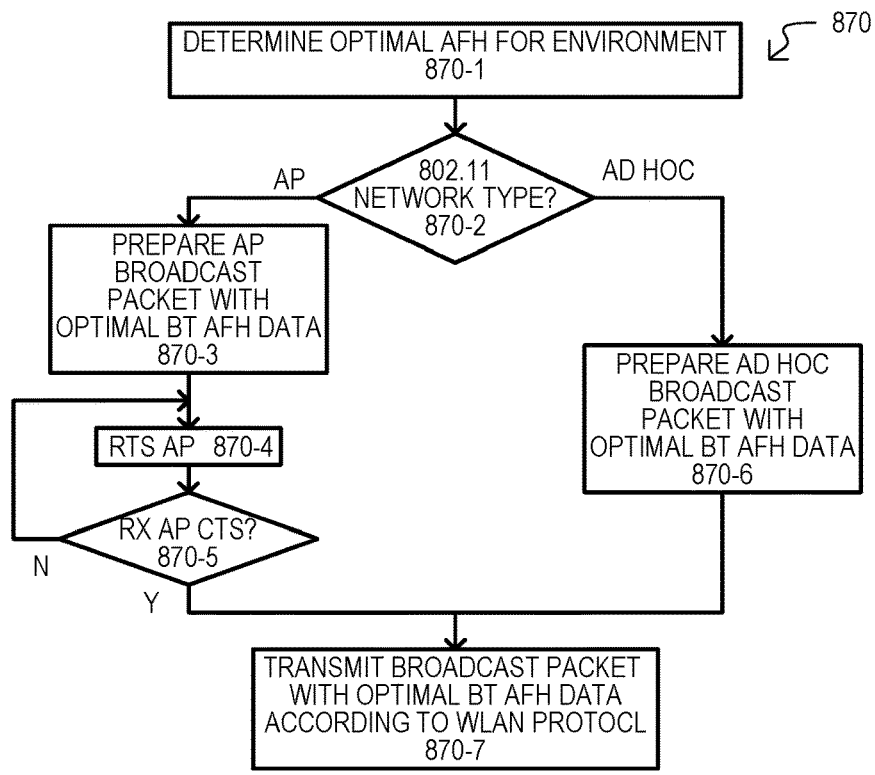
FIG. 8 is a flow diagram of a method according to an embodiment.

FIG. 8 is a flow diagram of method 870 for transmitting AFH configuration data from one combination device to another. Such a method can be executed by a combination device as disclosed herein, or equivalents. Method 870 can include determining an optimal AFH configuration for an environment 870-1. Such an action can include a combination device performing evaluation operations on an environment to determine an optimal AFH setting for a BT network. A method 870 can determine a type of WLAN network it is operating on 870-2. Such an action can include a combination device accessing network data it has stored. If a WLAN network is an infrastructure-basic service set (BSS) (AP from 870-2), a combination device can prepare for a broadcast operation over the BSS that can transmit the AFH configuration data for optimal performance. A ready to send (RTS) can be transmitted 870-4. Upon receiving a clear to send transmission from an access point (AP) (Y from 870-5), broadcast packet can be transmitted with the AFH configuration data 870-7. If a clear to send transmission is not received (N from 870-5), a method can continue to issue RTS indications (870-4).

If a WLAN network is an independent BSS (IBSS) (AD HOC from 870-2), a combination device can prepare for a broadcast operation over the IBSS 870-6, and the broadcast packet can be transmitted with the AFH configuration data 870-7.

Figure 9:
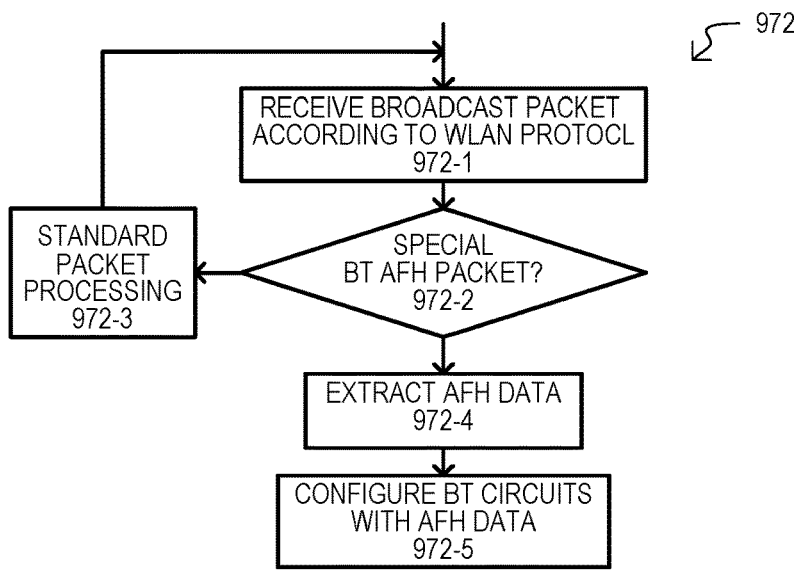
FIG. 9 is a flow diagram of a method according to another embodiment.

FIG. 9 is a flow diagram of method 972 for altering the AFH operations of a BT master in a combination device in response to receiving AFH configuration data from another combination device. Such a method can be executed by a combination device as disclosed herein, or equivalents. Method 972 can include receiving a packet according to a WLAN protocol 972-1. A method 972 can determine if the packet is a particular type of packet that includes BT AFH configuration data 972-2. Such an action can include examining processing control fields in the packet, examining a payload of the packet, or a combination thereof. If the packet is not the particular type of packet (N from 972-2), a method can process the packet in a standard fashion (972-3).

If the packet does include BT AFH configuration data (Y from 972-2), a method can extract the AFH configuration data 972-4 and then configured BT circuits to execute frequency hopping according to such configuration data 972-5. Such action can include any of those described herein or equivalents.

Figure 10:
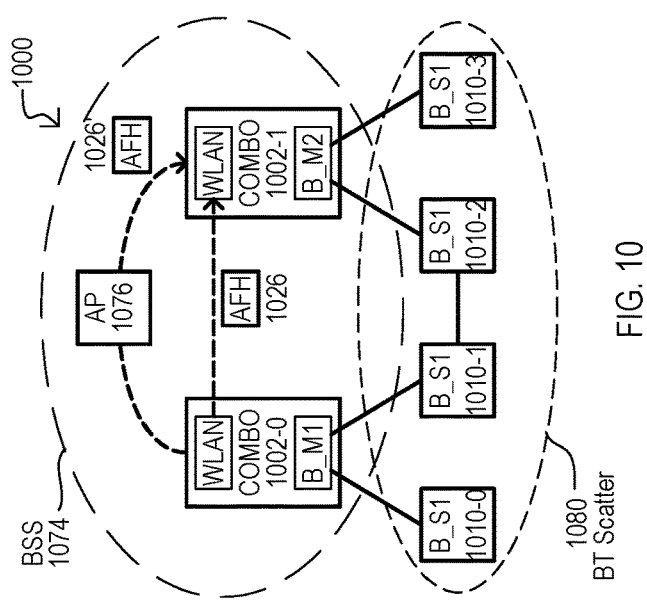
FIG. 10 is a block diagram of a system according to an embodiment.
Figure 12:
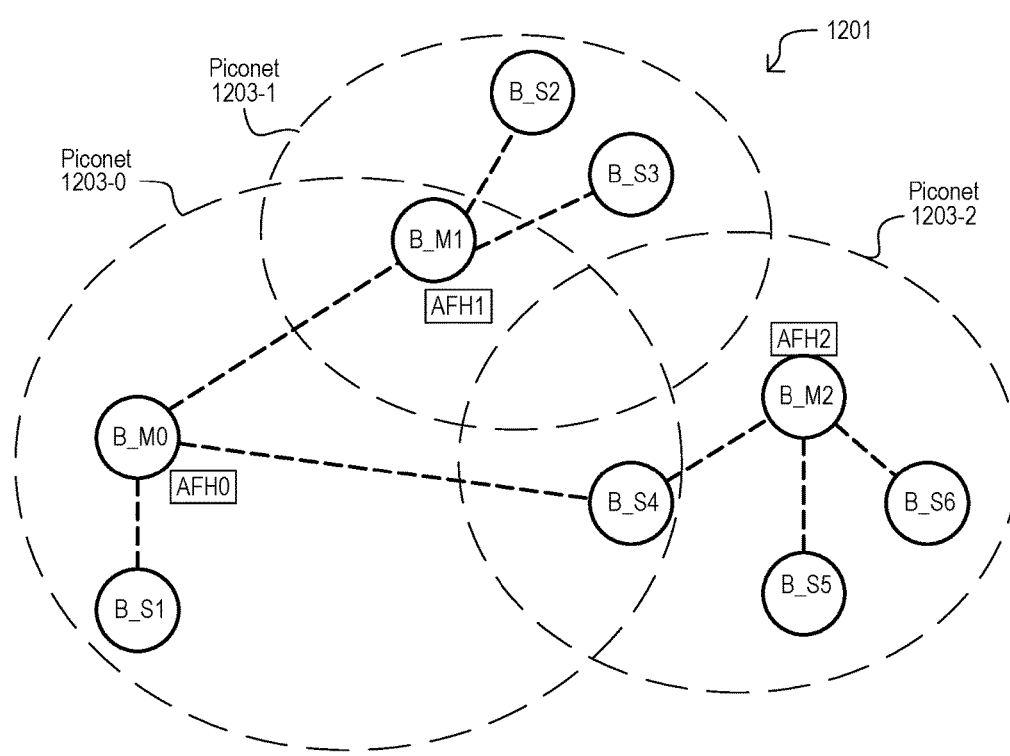
FIG. 12 is a block diagram of a conventional BT scatternet.

FIG. 10 is a diagram showing a system 1000 according to an embodiment. A system 1000 can include combination devices 1002-0/1, other BT devices 1010-0 to 1010-3, and, optionally, an AP device 1076. Combination devices 1002-0/1 (and AP device 1076, if included) can form a BSS 1074. Combination devices 1002-0/1 can each operate as BT masters for BT devices (1010-0 to -3) and can form a scatternet 1080.

Using BSS 1074, a first combination device 1002-0 can transmit AFH configuration data 1026 to a second combination device 1002-1. Second combination device 1002-1 can configure its BT master (B_M2) to execute AFH operations according to received AFH configuration data to optimize its performance.

Figure 11:
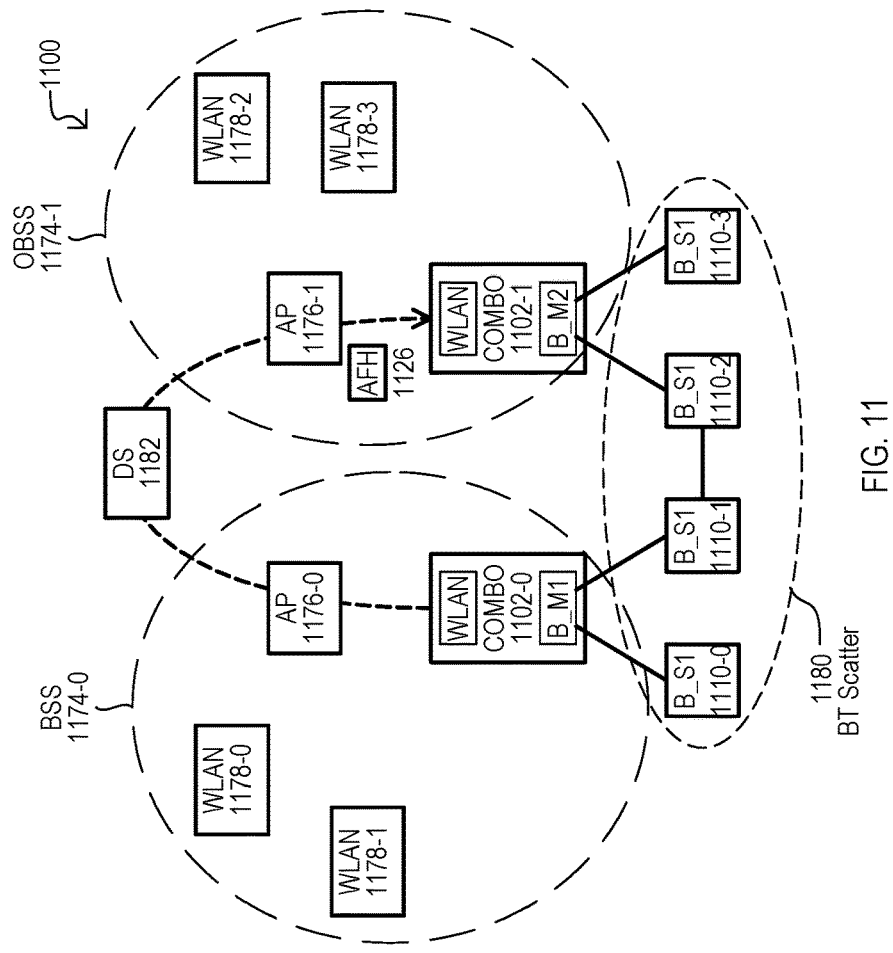
FIG. 11 is a block diagram of a system according to another embodiment.

FIG. 11 is a diagram showing a system 1100 according to another embodiment. A system 1100 can include a first BSS 1174-0 and a second BSS (OBSS) 1174-1. BSS 1174-0 can include a first combination device 1102-0, other WLAN devices 1178-0/1, and an AP 1176-0. OBSS 1174-1 can include a second combination device 1102-1, other WLAN devices 1178-2/3, and an AP 1176-1. A BT master (B_M1) in first combination device 1102-0, a BT master (B_M2) in second combination device 1102-1, and other BT devices 1110-0 to 1110-3 can form a scatternet 1180.

A first combination device 1102-0 can transmit AFH configuration data 1126 to a second combination device 1102-1 from BSS 1174-0 to OBSS 1174-1 through a distribution system (DS) 1182. A DS 1182 can enable communication between two or more access points in a wired or wireless fashion. Second combination device 1102-1 can configure its BT master (B_M2) to execute AFH operations according to received AFH configuration data to optimize its performance.

Embodiments described herein are in contrast to conventional systems in which transmissions from adjacent networks can interfere with one another. According to embodiments, a combination device of one network can transmit configuration data to a combination device of the adjacent network, which can then change its transmission characteristics to improve performance.

These and other advantages would be understood by those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
receiving frequency hop configuration data for a first wireless communication protocol via a second wireless communication protocol in second communication circuits; and
configuring first communication circuits to communicate according to the first communication protocol with frequency hopping indicated by the frequency hop configuration data; wherein
the first communication circuits and second communication circuits are formed in a same combination device.

2. The method of claim 1, wherein:
the same combination device is an integrated circuit having the first and second communication circuits formed in a same integrated circuit substrate.

3. The method of claim 1, further including:
by operation of another combination device, determining the frequency hop configuration data; and
by operation of the other combination device, transmitting the frequency hop configuration data with the second communication circuits of the same combination device, via the second wireless communication protocol.

4. The method of claim 3, wherein:
the same combination device is a master device according to the first communication protocol and in communication with at least one slave device of a first network;
the other combination device is a master device according to the first communication protocol and in communication with at least one slave device of a second network; and
at least one slave device of the first network is in communication with at least one slave device of the second network according to the first communication protocol.

5. The method of claim 1, wherein:
the first communication protocol is a Bluetooth protocol; and
the frequency hop configuration data determines adaptive frequency hopping of Bluetooth circuits in the same combination device.

6. The method of claim 1, wherein:
the second communication protocol includes operating according to at least one IEEE 802.11 wireless standard.

7. The method of claim 1, wherein:
the second communication protocol supports a maximum range greater than a maximum range supported by the first communication protocol.

8. A device, comprising:
first communication circuits configured to wirelessly receive and transmit data according to a first protocol;
second communication circuits configured to wirelessly receive and transmit data according to a second protocol different than the first protocol; and
control circuits configured to
determine frequency hopping configuration settings for the first protocol, and
transmit the frequency hopping configuration settings with the second communication circuits via the second protocol.

9. The device of claim 8, wherein:
the control circuits are further configured to
examine transmissions received by the second communication circuits according to the second protocol, and
if such transmissions include frequency hopping configuration settings for the first protocol, configure the first communication circuits according to the frequency hopping configuration settings.

10. The device of claim 8, wherein:
the first communication circuits, second communication circuits and control circuits are formed in a same integrated circuit substrate.

11. The device of claim 8, wherein:
the first protocol includes at least one Bluetooth standard.

12. The device of claim 8, wherein:
the second protocol includes at least one IEEE 802.11 wireless standard.

13. The device of claim 8, wherein:
the control circuits are configured to embed the frequency hopping configuration settings in a packet payload; and the second communication circuits are configured to transmit the packet payload in a packet according to the second communication protocol.

14. The device of claim 13, wherein:
the second communication circuits are configured to transmit the packet with a type field that indicates that the packet includes the frequency hopping configuration settings, the type field being different than the payload.

15. A system, comprising:
a first combination device including
first control circuits configurable to determine frequency hopping configuration settings for a first protocol,
first communication circuits configured to wirelessly communicate according to the first protocol, and
second communication circuits configurable to wirelessly transmit the frequency hopping configuration settings according to a second protocol; and
a second combination device including
third communication circuits configured to wirelessly receive the frequency hopping configuration settings according to the second protocol,
fourth communication circuits configured to wirelessly communicate according to the first protocol, and
second control circuits configurable to adjust the fourth communication circuits according to the frequency hopping configuration settings received by the third communication circuits.

16. The system of claim 15, wherein:
the first protocol includes at least one Bluetooth standard.

17. The system of claim 15, wherein:
the second protocol includes at least one IEEE 802.11 wireless standard.

18. The system of claim 15, wherein:
the first control circuits are configured to determine optimal transmission settings for the first protocol to generate the frequency hopping configuration settings.

19. The system of claim 15, wherein:
the first combination device further includes
the second communication circuits configured to wirelessly receive alternate frequency hopping configuration settings according to the second protocol, and
the first control circuits are further configurable to adjust the first communication circuits according to alternate frequency hopping configuration settings received by the second communication circuits; and
the second combination device further includes
the second control circuits configurable to determine the alternate frequency hopping configuration settings for the first protocol, and
the third communication circuits are configurable to wirelessly transmit the alternate frequency hopping configuration settings according to the second protocol.

20. The system of claim 15, wherein:
the first combination device and second combination device are integrated circuit devices.

* * * * *